May 30, 1961  L. SMALL  2,986,030
HARDNESS TESTING APPARATUS
Filed March 31, 1958  2 Sheets-Sheet 1
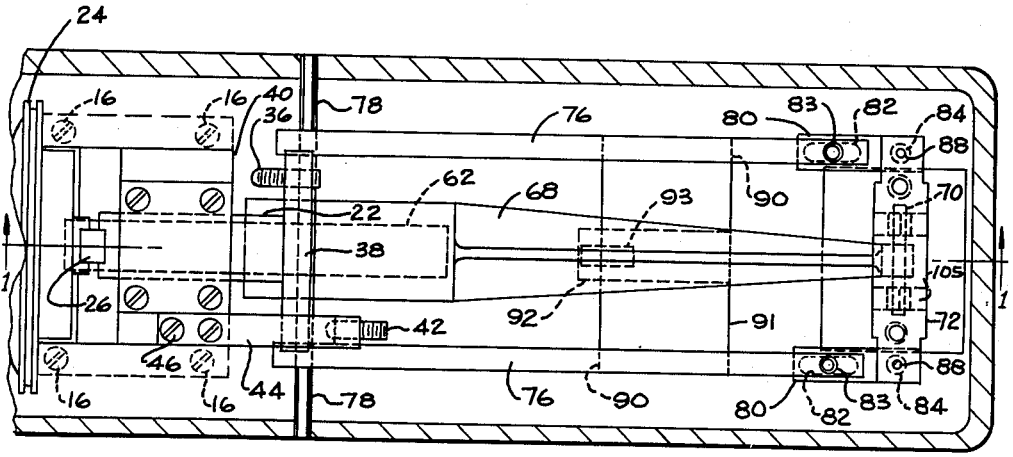
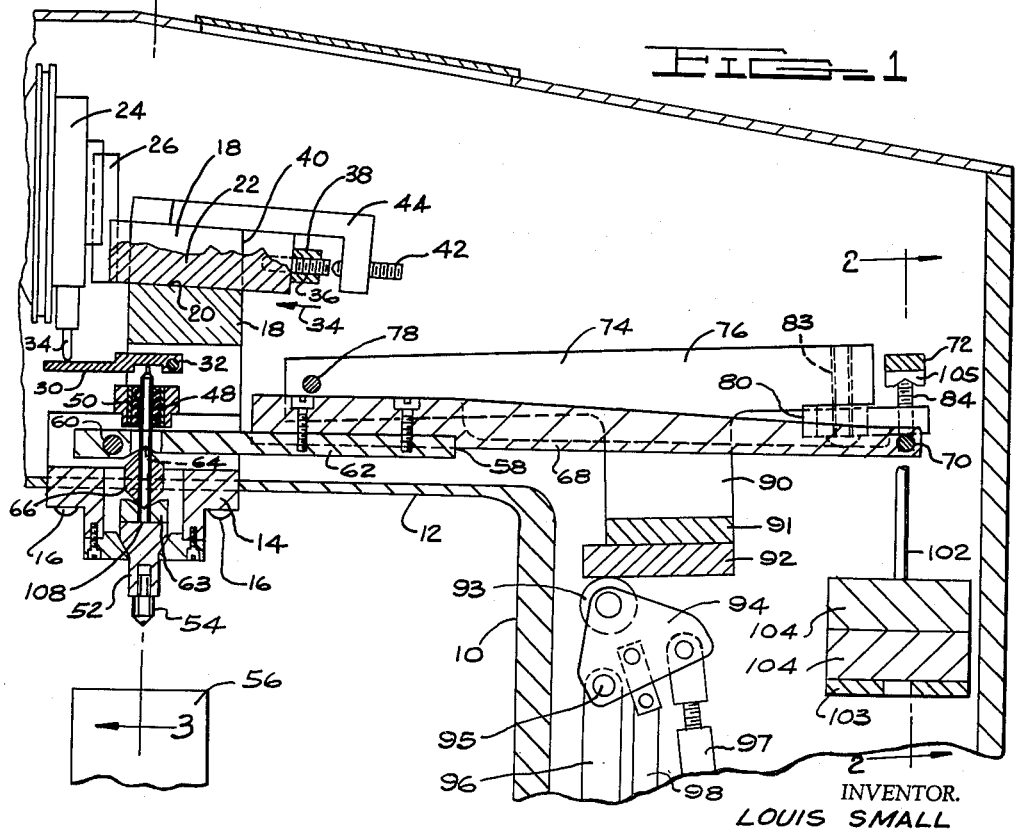
INVENTOR.
LOUIS SMALL
BY
SMITH, WILSON, LEWIS & McRAE May 30, 1961
L. SMALL
2,986,030
HARDNESS TESTING APPARATUS
Filed March 31, 1958
2 Sheets-Sheet 2
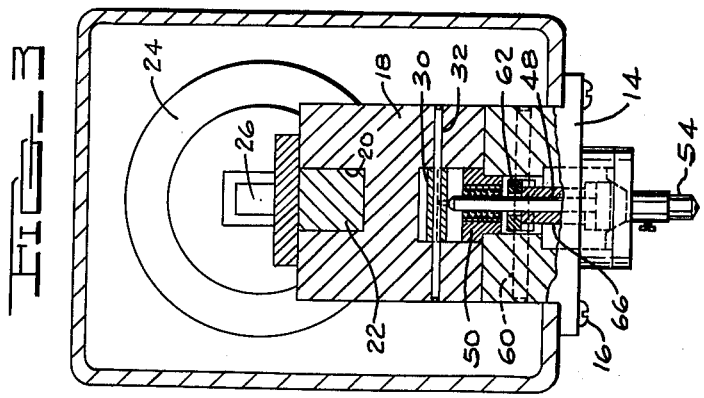
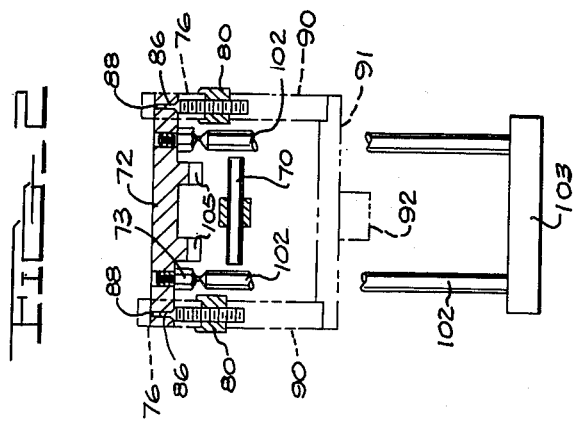
INVENTOR.
LOUIS SMALL
BY
SMITH, WILSON, LEWIS & McRAE

United States Patent Office

2,986,030
Patented May 30, 1961

---

2,986,030

HARDNESS TESTING APPARATUS

Louis Small, 2505 Burdette Ave., Ferndale, Mich.

Filed Mar. 31, 1958, Ser. No. 725,374

4 Claims. (Cl. 73—83)

This invention relates to hardness testing apparatus designed for indicating hardness on both "standard" scales and "superficial" scales.

In conventional hardness testers used with a variety of different materials it is necessary to vary the characteristics of the work penetrator as well as the characteristics of the major load. For example, with very hard materials a diamond tipped penetrator is employed, while with softer materials or materials having large grain size a steel ball penetrator is employed. Similarly the major load is varied within wide limits, as for example from 15 kg. to 150 kg. The "standard" scales in the Rockwell system are employed when using major loads in the range from 60 kg. through 150 kg. The "superficial" scales in the Rockwell system are employed when using major loads in the range from 15 kg. through 45 kg. In general the standard scales are employed for testing relatively thick work pieces, while the superficial scales are employed for testing relatively thin work pieces or case hardened pieces in which it is desired to have a comparatively small penetration into the work piece.

In testing apparatus of the above-identified type the penetrator is engaged with a small lever, which in turn is positioned against the actuator plunger of a dial indicator. The arrangement is such that when the major load is applied the penetrator movement is translated by the lever into a relatively large movement of the dial indicator plunger. In this manner sufficient deflection of the dial indicator needle is provided for obtaining an accurate indication of the work piece hardness.

When using the superficial hardness scales (low major loads) the penetrator movement is comparatively small. Accordingly, it is necessary to increase the leverage magnification so as to obtain the desired needle deflection over a significant portion of the dial. In prior art apparatus this increase in the leverage magnification has been achieved by shifting the lever so as to reposition its pivot relative to the penetrator and dial indicator plunger. Under the present invention leverage magnification is achieved by shifting the dial indicator along the length of the lever so as to establish a new positional relationship with respect to the lever pivot and penetrator.

A primary object of the present invention is to provide for changes in lever magnification in such manner that the lever pivot is constantly maintained in the same position, thereby eliminating any errors which might be caused by mounting the pivot on a movable support structure. In this connection it will be understood that any error in positioning the pivot will have a comparatively great effect on the instrument accuracy because it will be acting to vary the length of the relatively short moment arm between the lever pivot and penetrator.

In prior art instruments the manner of adjusting the leverage magnification (by shifting the lever pivot) is such that the effect of manufacturing errors on the instrument accuracy is necessarily different for the different leverage magnifications. This difference is due to the fact that the load is of different magnitude in each case so as to produce different bending effects in the load-carrying beam and different "flattening" of the knife edges and pivots. Under the present invention the adjusting operation is controlled by a setting operation at the factory in such a manner as to prevent the differences in load from causing error in the instrument accuracy. The factory setting operation is such as to also correct for possible manufacturing error due to multiple tolerance variations, as for example tolerance variations in lever pivot position, knife edge-notch relationship and penetrator mechanism position.

An object of the invention is to provide for eliminating cumulative manufacturing errors due to multiple tolerance variation.

Another object is to prevent the employment of different loads from having an effect on the instrument accuracy.

Other objects of this invention will appear in the following description and appended claims, reference being had to the accompanying drawings forming a part of this specification wherein like reference characters designate corresponding parts in the several views.

In the drawings:

Fig. 1 is a sectional view of one embodiment of the invention taken on line 1—1 in Fig. 4.

Fig. 2 is a sectional view on line 2—2 in Fig. 1.

Fig. 3 is a sectional view on line 3—3 in Fig. 1.

Fig. 4 is a top plan view of the Fig. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown the upper portion of a hardness tester 10 which is of the conventional C-shaped configuration in elevation. The tester includes an aluminum housing 12 which mounts a block 14 by means of screws 16. Fixedly positioned atop block 14 is a second block 18 which forms a guideway 20 for a slidably carriage block 22. A conventional dial indicator 24 is mounted on an upstanding arm 26 carried by block 22. The dial indicator is provided with the conventional actuator pin 34 for translating pivotal movement of lever 30 into a deflection of the dial indicator needle. The lever is pivotally carried within block 18 by means of a pin 32.

From the description thus far it will be seen that when carriage block 22 is manually moved in guideway 20 in the arrow 34 direction the dial indicator plunger is positioned at different points along the length of lever 30. Arrow 34 movement is limited by an adjustable stop screw 36 carried on an arm-like extension 38 of block 22; the action is such that screw 36 strikes face 40 of fixed block 18 to limit the arrow 34 movement. Reverse movement of carriage block 22 is limited by a stop screw 42 carried on a fixed arm 44; the action is such that extension 38 strikes screw 42 to limit the block movement. Screws 46 secure arm 44 onto fixed block 18.

An intermediate point on lever 30 registers with a rod 48 which is slidably mounted for vertical movement within a ball bearing assembly 50 fixedly carried in blocks 14 and 18. Assembly 50 is preferably constructed in the manner shown in U.S. Patent No. 2,726,540 in order to have minimum frictional drag on rod 48 with maximum ability to hold the rod in a truly vertical position. The lower end of rod 48 is secured to a holder 52 for a removable work penetrator 54. During operation of the mechanism penetrator 54 is caused to penetrate into the work carried on anvil 56 so as to carry rod 48 downwardly in such manner as to allow lever 30 to be lowered about pivot 32. Dial indicator 24 measures the amount of work penetration.

It will be noted that rod 48 is formed with a spherical tip having a relatively small diameter, whereas plunger 34 is formed with a spherical tip having a relatively large diameter. With this arrangement the points of engagement between lever 30 and the two spherical tips undergo minimum shift during lever movement. The amount of shift which does occur during work penetration is in proportion to the lengths of the respective lever arms so as to result in minimum error.

In order to effect the penetration there is provided a beam 58 which is pivotally mounted in block 14 by means of a shaft 60. Beam 58 includes a plate 62 and a support element 68. Plate 62 is formed with a notch 64 for receiving a knife edge element 66 carried by notched support element 63 positioned on holder member 52. Support element 68 carries a cross pin 70 at its outer end (Fig. 2) which is located in spaced relation below a cross piece 72 adjustably carried on one end of a second beam 74.

Beam 74 comprises two parallel arm members 76 pivotally supported within housing 12 by means of a shaft 78. The right end of each arm member 76 carries a slide 80 which is provided with a slot 82 for adjustment purposes. A screw 83 extends through each slot 82 into the superjacent arm member 76 to clamp the respective slide 80 in adjusted positions thereon. Each slide 80 carries a screw 84 which is provided with a reduced section 86 seated in an opening 88 in cross piece 72. The adjustments provided by slots 82 and screws 84 insure correct horizontal and vertical positioning of beam 74 with respect to cross piece 72. Ball-socket joints are provided at 73 (Fig. 2) for pivotally suspending weight hanger rods 102. The lower ends of rods 102 are interconnected by means of a platform 103 which carries the weights 104 so as to constitute the major load. In using the apparatus with the superficial scales weights 104 may be removed, in which case platform 103 forms the major load.

Arm members 76 are each provided with downwardly projecting extensions 90 which are interconnected at their lower ends by means of a cross member 91. An intermediate portion of member 91 carries a wear plate 92 which rides on a roller 93 movably mounted on lever 94. Lever 94 is rotatably mounted on a pin 95 carried in a fixed arm structure 96.

In the Fig. 1 position lever 94 is at its uppermost position of elevation. Elevation of the lever is effected by means of a rod 97 which is moved upwardly to its Fig. 1 position by means of a conventional manually-operated crank (not shown) located adjacent a lower portion of housing 12. The axis of pivot pin 95 is slightly to the right of the roller 93 axis in the Fig. 1 position; consequently lever 94 will automatically remain in the Fig. 1 position supporting the weight of beam 74. However, when rod 97 is pulled downwardly the weight of beam 74 becomes effective to lower the beam against the opposition of dashpot rod 98. Rod 98 carries a piston 99 (not shown) which operates in a dashpot cylinder to restrain beam 74 in its downward movement. Beam 74 is thus enabled to move slowly downward so as to transfer major load 103, 104 onto beam 58 without such impact as would tend to provide undesired variation in the movement of member 54 into a given work piece.

In transferring the major load onto beam 58 cross piece 72 is lowered (by pivoting of lever 94) until its notched projections 105 engage cross pin 70. Thereafter the major load is transferred from beam 74 onto pin 70 and beam 58.

In use of the illustrated apparatus, the work piece is initially positioned on anvil 56. The anvil is then elevated by a conventional elevating screw (not shown) so as to force the work against penetrator 54. Pressure of the work piece forces rod 48 upward so as to deflect lever 30 upwardly about pivot 32. As a result plunger 34 is moved upwardly so as to cause the dial indicator to make a desired number of revolutions, as for example three revolutions. Conventionally the dial indicator is provided with a small counting pointer for indicating when the desired number of needle revolutions is completed.

During elevational movement of anvil 56 beam 58 is forced upwardly about pivot 60 so as to apply a minor load onto the penetrator 54. This minor load forces the penetrator to move into the work piece to as to position its tip beneath any surface imperfections in the work piece.

After the minor load has been applied rod 97 is caused to be lowered by the conventional crank (not shown) so as to permit beam 74 to transfer the major load onto beam 58. Application of the major load causes penetrator 54 to move into the work piece so as to draw rod 48 downward a predetermined distance in accordance with the work piece softness. Downward movement of rod 48 allows lever 30 to be pivoted downwardly, with a consequent downward movement of plunger 34 and rotary movement of the dial indicator needle.

In using the apparatus with "standard" scales the major load is comparatively heavy. Accordingly a large penetration into the work is obtained, with a comparatively large downward movement of rod 48. This large downward movement of rod 48 must be magnified only a few times by lever 30 to obtain a desired traverse of the dial indicator needle over the dial. To obtain the desired magnification block 22 is slid to the right into engagement with screw 42; in this position plunger 34 will be fairly close to rod 48 so that lever 30 will be enabled to effect only a small magnification of the rod 48 movement, as for example a five unit movement of plunger 34 per single unit movement of rod 48.

In using the illustrated apparatus with the "superficial" scales the major load is lightened (by removal of weights 104) so as to give only a slight penetration of member 54 into the work piece. The downward movement of rod 48 must therefore be considerably magnified by lever 30 to obtain a satisfactorily large traverse of the dial indicator needle over the dial face. To obtain the desired magnification block 22 is adjusted to the left so as to put screw 36 against face 40; in the adjusted position plunger 34 will be located adjacent the left end of lever 30 so as to be movable through a comparatively large distance per unit movement of rod 48. The lever magnification may for example be ten to one.

It will be noted that change in the lever magnification is effected without change in the spacing between pivot 32 and rod 48. Prior art units have effected change in the magnification by varying this spacing; however this spacing is comparatively small so that any error in changing this spacing would have a comparatively great effect on the actual lever magnifications obtained. With the illustrated arrangement any error in varying the spacing between plunger 34 and rod 48 has a comparatively minor effect on the actual lever magnifications. Thus, a given error taking place with the present arrangement and described leverage magnifications has approximately one-tenth the effect as the same error would have in prior art units.

It will be noted that stops 36 and 42 are adjustable independently of one another in such manner as to correct for all possible cumulative errors which might occur in the instrument due to parts tolerance variations.

Such errors could arise for example by reason of improper location of notch 64 with respect to the upper knife edge on member 66. Member 66 is free on rod 48 so as to always seat in notch 64, but improper location of notch 64 would alter the moment arm around pivot 60. The location of pivot 60 is controlled by machining operations in both block 14 and member 62; an additional machining operation is necessary to form notch 64. These multiple machining operations in different members make it very difficult to control the short moment arm around pivot 60 with extreme exactitude. For similar reasons pivot 32 is never exactly located with respect to rod 48.

Even though the short moment arm around pivot 60 is exactly controlled there will still be a source of error due to the beam-bending effects of different major loads. Thus, when a 100 kg. major load is suspended from beam 58 said beam tends to bend to a greater extent than in the case when only 30 kg. is suspended. As a result, at high major loads the long moment arm from pivot 60 to hanger rods 102 is less than at low major loads. This difference in moment arms is of course translated into a difference in the relative effects on the penetrator mechanism.

An additional possibility of error exists by reason of the fact that the various load-transfer points 70, 64, axis of pivot 60, and knife edge 108 are not "points" or lines. They are actually small load areas which vary in area as the load is changed. Such variations, unless compensated for, have an inherent deleterious effect on the instrument accuracy.

Under the present invention stops 36 and 42 can be individually adjusted at the factory to compensate for errors which could otherwise creep in because of manufacturing tolerance variations or load magnitude variations. The location of stops 36 and 42 is between indicator means 24 and the remaining force elements. Thus, by utilizing calibrated work pieces at the factory, stops 36 and 42 can be adjusted to correct for all variations occuring between the work piece and plunger 34. The "independently adjustable" nature of the two stops allows the single illustrated instrument to actually constitute two separate independent, accurately functioning instruments.

I claim:

1. Hardness testing apparatus comprising fixed support structure; a work supporting member; a penetrator mechanism movably mounted in the support structure for movement toward and away from the work supporting member; a carriage having a substantial travel on the support structure for adjusting movements in directions at substantially right angles to the direction of movement of the penetrator mechanism; indicator means mounted on the carriage and having an actuator movable in directions parallel to the direction of movement of the penetrator mechanism; lever means pivotally mounted on the support structure and operatively engaging both the penetrator mechanism and actuator; and means for applying a load on the penetrator mechanism; whereby, adjustment of the carriage changes the ratio of the lever pivot-actuator moment arm to the lever pivot-penetrator mechanism moment arm so as to vary the actuator movement per unit movement of the penetrator mechanism.

2. Hardness testing apparatus comprising fixed support structure; a work supporting member; a penetrator mechanism movably mounted in the support structure for movement toward and away from the work supporting member; indicator means including a movable actuator; a lever pivotally mounted on the support structure and operatively engaging both the penetrator mechanism and actuator; mechanism supporting the indicator means for precision adjusting movements substantially normal to the actuator and of a predetermined magnitude corresponding with the lever pivot-penetrator mechanism moment arm; and means for applying a load on the penetrator mechanism; whereby adjusting movement of the indicator means changes the ratio of the lever pivot-actuator moment arm to the lever pivot-penetrator mechanism moment arm so as to vary the actuator movement per unit movement of the penetrator mechanism.

3. Hardness testing apparatus comprising fixed support structure; a work supporting member; a penetrator mechanism movably mounted in the support structure for movement toward and away from the work supporting member; a carriage having a substantial slidable travel on the support structure for adjusting movements in directions at substantially right angles to the direction of movement of the penetrator mechanism; indicator means mounted on the carriage and having an actuator movable in directions parallel to the direction of movement of the penetrator mechanism; lever means pivotally mounted on the support structure and operatively engaging both the penetrator mechanism and actuator; first and second stops for limiting the adjusting movement of the carriage; means for individually moving the stops in directions parallel to the path of motion of the carriage so as to accurately locate the carriage in two positions of adjustment; and means for applying a load on the penetrator mechanism; whereby, adjustment of the carriage changes the ratio of the lever pivot-actuator moment arm to the lever pivot-penetrator mechanism moment arm so as to vary the actuator movement per unit movement of the penetrator mechanism.

4. Hardness testing apparatus comprising fixed support structure; a work supporting member; a penetrator mechanism movably mounted in the support structure for movement toward and away from the work supporting member; a carriage having an extensive slidable travel on the support structure for adjusting movements in directions at substantially right angles to the direction of movement of the penetrator mechanism; indicator means mounted on the carriage and having an actuator movable in directions parallel to the direction of movement of the penetrator mechanism; a lever pivotally mounted on the support structure and operatively engaging both the penetrator mechanism and actuator; whereby, adjustment of the carriage changes the ratio of the lever pivot-actuator moment arm to the lever pivot-penetrator mechanism moment arm so as to vary the actuator movement per unit movement of the penetrator mechanism; a first beam pivotally carried on the support structure in pressure engagement with the penetrator mechanism; a second lowerable beam pivotally carried on the support structure and having a beam portion passing through the plane of the first beam during the lowering movement; and a load releasably carried by said beam portion and having portions thereof registering with a part of the first beam; whereby during lowering movement of the second beam the load is caused to be transferred from the second beam onto the first beam for application onto the penetrator mechanism.

References Cited in the file of this patent

UNITED STATES PATENTS

| | | |
|---|---|---|
| 1,978,302 | Gogan | Oct. 23, 1934 |
| 2,360,760 | Clark | Oct. 17, 1944 |
| 2,790,321 | Huyser | Apr. 30, 1957 |
| 2,892,345 | Sklar | June 30, 1959 |